United States Patent
Hill et al.

(10) Patent No.: US 11,741,445 B1
(45) Date of Patent: *Aug. 29, 2023

(54) PROVISIONING OF AN INDIVIDUAL COMPUTING DEVICE VIA ATM

(71) Applicant: Wells Fargo Bank, N.A., San Francisco, CA (US)

(72) Inventors: Miranda C. Hill, Seattle, WA (US); Alicia Y. Moore, San Ramon, CA (US); Susan Symons, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,183

(22) Filed: Aug. 15, 2022

Related U.S. Application Data (63) Continuation of application No. 17/320,962, filed on May 14, 2021, now Pat. No. 11,416,836, which is a (Continued)

(51) Int. Cl.
*G06Q 20/10* (2012.01)
*G07F 19/00* (2006.01)
(Continued)

(52) U.S. Cl.
CPC ........... *G06Q 20/1085* (2013.01); *G06F 8/61* (2013.01); *G06Q 20/3223* (2013.01);
(Continued)

(58) Field of Classification Search
None
See application file for complete search history.

(56) References Cited

U.S. PATENT DOCUMENTS 7,565,312 B1 * 7/2009 Shaw .................. G06Q 40/123
705/30
8,856,748 B1  10/2014 Larsen et al.
(Continued)

OTHER PUBLICATIONS

"Meg Conlan-Donnelly, Pre-Staging Tech Improves the Speed and Security of Bank Transactions, Sep. 29, 2015, BizTech" (Year: 2015).*

(Continued)

*Primary Examiner* — Kito R Robinson
*Assistant Examiner* — Toan Duc Bui
(74) *Attorney, Agent, or Firm* — Foley & Lardner LLP (57) ABSTRACT

An automated teller machine (ATM) includes a network interface and an authentication circuit configured to receive data indicative of an interaction with the ATM by a user, detect that an individual computing device is in proximity to the ATM, determine that the individual computing device is not associated with a financial account, display a prompt comprising instructions to bind the individual computing device of the user to the financial account, receive data comprising a unique identifier of the individual computing device of the user, bind the individual computing device to the financial account based at least in part on the received unique identifier of the individual computing device of the user, and transmit, to the individual computing device, an application authorization, the application authorization authorizing an application to complete operations associated with the financial account via the bound individual computing device of the user.

16 Claims, 6 Drawing Sheets

Related U.S. Application Data continuation of application No. 15/466,077, filed on Mar. 22, 2017, now Pat. No. 11,010,737.

(60) Provisional application No. 62/317,397, filed on Apr. 1, 2016.

(51) Int. Cl.
| | |
|---|---|
| *G06F 8/61* | (2018.01) |
| *H04L 9/40* | (2022.01) |
| *G06Q 20/32* | (2012.01) |
| *G06Q 20/40* | (2012.01) |

(52) U.S. Cl.
CPC ... *G06Q 20/3278* (2013.01); *G06Q 20/40145* (2013.01); *G07F 19/202* (2013.01); *G07F 19/203* (2013.01); *H04L 63/0861* (2013.01)

(56) References Cited

U.S. PATENT DOCUMENTS

| | | | |
|---|---|---|---|
| 9,706,515 | B1 | 7/2017 | Chadwick |
| 10,445,711 | B1* | 10/2019 | Arumugam ........ G06Q 20/3274 |
| 10,755,507 | B2* | 8/2020 | Zwink ..................... G07C 9/23 |
| 2001/0014881 | A1* | 8/2001 | Drummond ............ G06Q 40/04 |
| | | | 705/37 |
| 2009/0055292 | A1 | 2/2009 | Chong et al. |
| 2014/0324638 | A1* | 10/2014 | Khalid ................. H04B 5/0056 |
| | | | 705/27.1 |
| 2014/0324689 | A1* | 10/2014 | Pinault ............... G06Q 20/3223 |
| | | | 705/41 |
| 2015/0051976 | A1 | 2/2015 | Brown et al. |
| 2015/0055174 | A1 | 2/2015 | Baba |
| 2015/0066745 | A1 | 3/2015 | Lee |
| 2015/0112862 | A1* | 4/2015 | Kheradpir ........... H04L 63/0281 |
| | | | 705/44 |
| 2015/0193765 | A1* | 7/2015 | Gadotti ............. G06Q 20/3278 |
| | | | 705/39 |
| 2016/0180305 | A1 | 6/2016 | Dresser et al. |
| 2016/0364729 | A1 | 12/2016 | Ruparelia et al. |

OTHER PUBLICATIONS

"Suzanne Cluckey, New guide offers a comprehensive view of ATM and mobile integration, Oct. 29, 2014" (Year: 2014).*

* cited by examiner

PROVISIONING OF AN INDIVIDUAL COMPUTING DEVICE VIA ATM

CROSS-REFERENCE TO RELATED APPLICATIONS

This application is a continuation of U.S. patent application Ser. No. 17/320,962 filed May 14, 2021, which is a continuation of U.S. patent application Ser. No. 15/466,077 filed Mar. 22, 2017, now U.S. Pat. No. 11,010,737, which claims priority to U.S. Provisional Patent Application No. 62/317,397 filed Apr. 1, 2016, each of which is incorporated herein by reference in its entirety.

BACKGROUND

Users of individual computing devices such as mobile phones that also have a financial account at a financial institution may use automated teller machines ("ATMs"). The ATMs may be associated with the financial institution, associated with a different financial institution, independently-owned, etc. ATMs are often used to quickly and efficiently manage financial accounts, perform financial transactions, and update settings, options, or other data associated with the financial accounts. ATMs are capable of performing increasingly complex and varied operations relating to customer accounts.

Users of individual computing devices often install various applications on their devices, some of which have been authorized to have access to one or more financial accounts of the users with the financial institution

SUMMARY

One embodiment relates to a method. The method includes receiving, by an Automated Teller Machine (ATM), data indicative of an interaction with the ATM by a user. The method includes detecting, by the ATM, that an individual computing device is in proximity to the ATM. The method includes determining, by the ATM, that the individual computing device is not associated with a financial account associated with the user. The method includes displaying a prompt, by the ATM on a display of the ATM, comprising instructions to bind the individual computing device of the user to the financial account associated with the user. The method includes receiving data, by the ATM from the individual computing device, comprising a unique identifier of the individual computing device of the user consequent to displaying the prompt on the display of the ATM. The method includes binding, by the ATM, the individual computing device to the financial account based at least in part on the received unique identifier of the individual computing device of the user. The method includes transmitting, by the ATM to the individual computing device, an application authorization, the application authorization authorizing an application to complete operations associated with the financial account via the bound individual computing device of the user.

Another embodiment relates to an automated teller machine (ATM). The ATM includes a network interface. The ATM includes an authentication circuit configured to receive data indicative of an interaction with the ATM by a user. The authentication circuit is configured to detect that an individual computing device is in proximity to the ATM. The authentication circuit is configured to determine that the individual computing device is not associated with a financial account associated with the user. The authentication circuit is configured to display a prompt, on a display of the ATM, comprising instructions to bind the individual computing device of the user to the financial account associated with the user. The authentication circuit is configured to receive data, from the individual computing device, comprising a unique identifier of the individual computing device of the user consequent to displaying the prompt on the display of the ATM. The authentication circuit is configured to bind the individual computing device to the financial account based at least in part on the received unique identifier of the individual computing device of the user. The authentication circuit is configured to transmit, to the individual computing device, an application authorization, the application authorization authorizing an application to complete operations associated with the financial account via the bound individual computing device of the user.

Yet another embodiment relates to a non-transitory computer readable medium having computer-executable instructions embodied therein that, when executed by at least one processor of a computing system, cause the computing system to perform various operations. The operations include receiving data indicative of an interaction with the computing system by a user. The operations include detecting that an individual computing device is in proximity to the computing system. The operations include determining that the individual computing device is not associated with a financial account associated with the user. The operations include displaying a prompt, on a display of the computing system, comprising instructions to bind the individual computing device of the user to the financial account associated with the user. The operations include receiving data, from the individual computing device, comprising a unique identifier of the individual computing device of the user consequent to displaying the prompt on the display of the computing system. The operations include binding the individual computing device to the financial account based at least in part on the received unique identifier of the individual computing device of the user. The operations include transmitting, to the individual computing device, an application authorization, the application authorization authorizing an application to complete operations associated with the financial account via the bound individual computing device of the user.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, systems and methods for provisioning of an individual computing device (e.g., a mobile device such as a mobile phone) at ATMs are shown. Provisioning of an individual computing device includes binding the individual computing device to a financial account or accounts associated with a financial institution computing system or binding an application installed on the individual computing device to the financial account or accounts. Such systems and methods use ATMs (automated teller machines or ATMs) to facilitate communication with the individual computing devices and retrieve a unique identifier from the individual computing devices. In some arrangements, the unique identifier, whether received from the ATM or through another communication channel, can be used to further verify the identity of a user of the individual computing device as well as verify that the individual computing device belongs to or is being used by the same user that has a financial account with a financial institution. Once the user is verified and the individual computing device is determined to belong to or used by the user, the individual computing device can be provisioned by binding either the entire individual computing device or an application on the individual computing device to the financial account(s) associated with the user. In some arrangements, binding the individual computing device involves authorizing any approved application installed on the individual computing device to access one or more financial accounts of the user. In some arrangements, verifying the individual computing device and user involves sending the unique identifier to a telecommunications company computing system that services the individual computing device and receiving back information (e.g., a name on the account) that matches information associated with the financial account. When incorporating the use of an ATM, the identity information used to access the ATM may be combined with the additional verification of the user and the individual computing system to give higher level of assurances of a proper binding of the individual computing system to a financial account or accounts.

In addition, embodiments described herein solve the technical and internet-centric problem of determining whether and how an individual computing device should be authorized to be bound to a financial account or accounts associated with a financial computing system. This is addressed by leveraging known identity verification data with additional data obtained from the individual computing device and confirmed from communication to a telecommunication computing system associated with servicing the individual computing device. In some embodiments, an ATM can also be leveraged to confirm the identity of an individual, retrieve data (e.g., a unique identifier) from the individual computing device using close proximity communication protocols, and in some cases push the application on to the individual computing device along with authorization to install and be linked to a financial account of the user.

Figure 1:
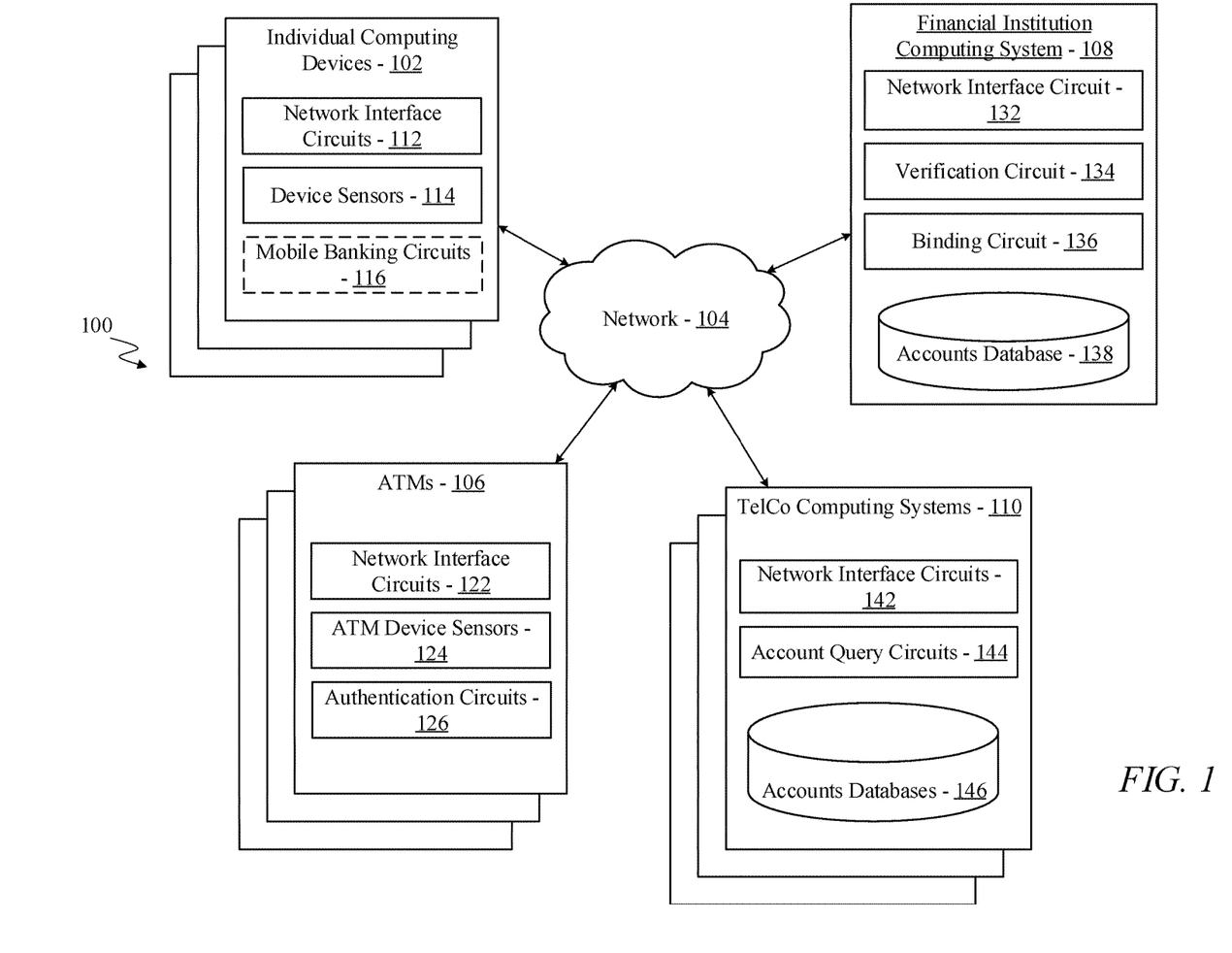
FIG. 1 is a block diagram of a system for facilitating the provisioning of an individual computing device via ATM shown according to an example embodiment.

Referring now to FIG. 1, an embodiment of an environment 100 is depicted. In brief overview, the environment 100 includes one or more individual computing devices 102 used by users with financial accounts with financial institutions connected to a network 104. Also connected to the network 104 are ATMs 106, a financial institution computing system 108, and TelCo computing systems 110 (telecommunication company computing systems). The financial institution computing system 108 is affiliated with a financial institution, such as a bank. In some arrangements, the individual computing devices 102 communicate over the network 104 to the ATMs 106 and the financial institution computing system 108. The individual computing devices 102 are smartphones, laptop computers, tablet computers, e-readers, smartwatches, and the like. In some arrangements, the ATMs 106 also communicate over the network 104 to TelCo computing systems 110 and the financial institution computing system 108. In some arrangements, the financial institution computing system 108 communicates over the network 104 to the TelCo computing systems 110. In some arrangements, various components of the financial institution computing system 108 can instead be incorporated in the ATMs 106 or vice versa. In arrangements, where one or more of the ATMs 106, financial institution computing system 108, and the TelCo computing systems 110 are separate computing systems from the other computing systems communicating over the network 104, communication and sharing of information can be aided by application programming interfaces (APIs). The APIs may be installed on one or more of the computing systems to facilitate sharing content and data. For example, an API is installed on the financial institution computing system 108 to share some or all of the accounts database 138 information with the ATMs 106. In reference to components described herein, references to the components in singular or in plural form are not intended as disclaimers of alternative arrangements unless otherwise indicated. The components are configured to interact, in some arrangements, as described in further detail below.

In the environment 100, data communication between the individual computing devices 102, the ATMs 106, the financial institution computing system 108, and the TelCo computing systems 110 in various combinations are facilitated by the network 104. In some arrangements, the network 104 includes the internet. In other arrangements or combinations, the network 104 includes a local area network or a wide area network. The network 104 is facilitated by short and/or long range communication technologies including Bluetooth® transceivers, Bluetooth® beacons, RFID transceivers, NFC transceivers, Wi-Fi transceivers, cellular transceivers, wired network connections (e.g., Ethernet), etc. In some other arrangements, particularly for communication between the ATMs 106 and the financial institution computing system 108, the network 104 comprises an interbank network (e.g., Maestro, NYCE®, PLUS, Cirrus, STAR, etc.) including a plurality of member financial institutions enabling customers of a first interbank network member to perform ATM transactions at an ATM owned or operated by a second interbank network member or even independently owned ATMs.

Still referring to FIG. 1, the individuals using individual computing devices 102 are in communication with and/or have accounts with a financial institution associated with the financial institution computing system 108. The individuals may have accounts with the telecommunication companies associated with the TelCo computing systems 110. In some arrangements, individuals include single persons as well as households and families and may also include, companies, corporations, or other entities using the system(s) herein to maintain accounts with financial institutions and telecommunication companies. Individuals communicate via an individual computing device 102 over a respective network interface circuit 112 over the network 104 to a financial institution computing system 108 and/or an ATM 106 via individual computing devices 106. In some arrangements, individual computing devices 102 are mobile computing devices such as smartphones, laptop computers, tablet computers, e-readers, smartwatches, and the like. Data passing through the respective network interface circuits 112 can be encrypted such that the network interface circuit 112 is a secure communication module. The network 104 enables components of the system 100 to communicate with each other (e.g., the financial institution computing system 108 and the ATMs 106). The network 104 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 104 includes the internet. In some arrangements, the network 104 includes a proprietary network between the ATMs 106 and the financial institution computing system 108 (e.g., where the financial institution owns and/or operates the ATM). In some arrangements, the network 104 comprises an interbank network (e.g., Maestro, NYCE®, PLUS, Cirrus, STAR, etc.) including a plurality of member financial institutions enabling customers of a first interbank network member to perform ATM transactions at an ATM owned or operated by a second interbank network member or even independently owned ATMs.

The individual computing devices 102 are mobile computing systems configured to run applications and communicate with other computer systems over a network 104. For example, the individual computing device 102 is configured to allow a customer to view financial account balances or transfer funds from a given account with a financial institution by using mobile banking circuits 116 (e.g., a circuit formed at least in part by an application associated with the financial institution and installed on the individual computing device 102). The individual computing devices 102 as depicted include network interface circuits 112, device sensors 114, and mobile banking circuits 116. Data passing through the network interface circuits 112 is encrypted such that the network interface circuits 112 are secure communication modules. In some arrangements, the network interface circuits 112 comprise one or more Bluetooth® transceivers, RFID transceivers, NFC transceivers, Wi-Fi transceivers, cellular transceivers, and the like. In some arrangements, components of the individual computing devices 102 (e.g., device sensors 114) are connected by wired or wireless connections.

In some arrangements, the device sensors 114 can be configured to gather data on the environment around the individual computing devices 102 including the user of the individual computing device 102. Device sensors 114 include biometric sensors (e.g., fingerprint scanners, cameras—facial recognition/gait recognition/hand geometry recognition, scanners—iris/retina/thermogram/skin reflection/infrared, voice recognition microphones, galvanic response, etc.). In some arrangements, the device sensors 124 including the biometric sensors are configured to gather data to authenticate an identity of the user of the individual computing devices 102 and the data is sent to other devices (e.g., ATMs 106) to help in identity verification.

The individual computing devices 102, as shown in FIG. 1, comprise mobile banking circuits 116. In some arrangements, the mobile banking circuits are configured to access financial account information stored on a financial institution computing system 108. In some arrangements, the mobile banking circuits 116 comprise an application installed on the individual computing devices 102. Authorization to install and/or use mobile banking circuits 116 (e.g., a financial institution application) is not available until the individual computing device 102 is paired to a financial account with the financial institution associated with the financial institution computing system 108.

The ATMs 106 are computing systems configured to provide an interface between an individual (e.g., a customer with account information stored on the financial institution computing system 108) and the financial institution computing system 108, allowing the individual to access information at and perform transactions with the corresponding financial institution. For example, the ATM 106 is configured to allow a customer to view financial account balances, deposit checks, transfer funds, or withdraw funds from a given account in the form of cash. In some arrangements, the ATM 106 dispenses cash through a cash dispenser, receives checks, cash, money orders, and other forms of deposit in through an intake slot. The intake slot may include an automated feed mechanism to receive, count, and verify provided items. The ATM 106 displays financial account balances and other account information on a display screen and allows inputs from the user through buttons and/or touchscreen interfaces. The ATM 106 may be disposed at a brick and mortar banking facility associated with the financial institution, or may be a standalone computing device (e.g., disposed at an unrelated retail facility, within an office building, etc.). The ATMs 106 as depicted include network interface circuits 122, ATM device sensors 124, and authentication circuits 126. Data passing through the network interface circuits 122 is encrypted such that the network interface circuits 122 are secure communication modules. In some arrangements, the network interface circuits 122 comprise one or more Bluetooth® transceivers, RFID transceivers, NFC transceivers, Wi-Fi transceivers, cellular transceivers, and the like. In some arrangements, the authentication circuits 126 reside in part on different computing devices or systems (e.g., in the financial institution computing system 108) in relation to other components or to the whole of a particular component.

In some arrangements, the ATM device sensors 124 can be configured to gather data on individuals or associated with individuals using the ATMs 106. ATM device sensors 124 include biometric sensors (e.g., fingerprint scanners, cameras—facial recognition/gait recognition/hand geometry recognition, scanners—iris/retina/thermogram/skin reflection/infrared, voice recognition microphones, galvanic response, etc.). In some arrangements, the device sensors 124 including the biometric sensors are configured to gather data to send to the authentication circuit 126 to authenticate or help authenticate the identity of the individual using or approaching the ATM 106.

The ATMs 106, as shown in FIG. 1, comprise authentication circuits 126. In some arrangements, the authentication circuits are configured to authenticate the identity of an individual user of the ATM 106. In some arrangements, authentication is obtained through the use of a card containing encoded information (e.g., debit card with magnetic stripe) and an inputted personal identification number (PIN) that is used directly with the ATM 106. Other authentication data is obtained from the ATM device sensors 124. For example, the identity authentication information comprises biometric information, such as a finger print, thumb print, hand print, or any print of the body. Authentication information may also comprise a facial image, an eye image (iris or retina), a vocal sample, captured gait information, hand geometry information, thermogram data, skin reflection data, infrared sensor data, etc. The authentication circuits 126 along with the network interface circuits 122 are configured to communicate with and gather a device identifier and a subscriber identity module (SIM) card identifier from individual computing devices 102 of the individuals interacting with the ATMs 106. The authentication circuits 126 and or network interface circuits 122 are configured to wirelessly and securely exchange data over short distances (e.g., within a range of a few inches or less). In some arrangements, the exchange uses RFID to exchange digital information. In other arrangements, Bluetooth®, including low-power Bluetooth® is used. Beacon technology, including Bluetooth® beacon is used to communicate the presence of an ATM 106 to an individual computing device 102. In other arrangements other NFC communication protocols are used. In some arrangements, the authentication circuits 126 are configure to receive and utilize data received from a sensor or touchscreen of an individual computing device 102 or transmit data to facilitate authentication. Data received or transmitted may be a gesture pattern on the individual computing device 102 (i.e., hand pattern, phone movement pattern, keypad entry pattern, etc.), a security image recognizable by the user, a vibrational pattern on phone, a bar code displayed on the phone (e.g., 2D or 3D barcode), etc. The authentication information is captured by the individual user device 102 or a sensor device connected to the individual user device 102. Any one or a combination of the authentication information described throughout is used to authenticate the user. The ability to use such varying types of authentication provides for a higher level of security than a four digit PIN associated with an ATM card.

The financial institution computing system 108 is associated with a financial institution (e.g., a bank, a credit card issuer, etc.). The financial institution computing system 108 includes a network interface circuit 120, a verification circuit 122, a binding circuit 136 and an account database 138. The verification circuit 134 and the binding circuit 136 control at least some operations of the financial institution computing system 108 using data stored in databases or other computer storage structures, such as the account database 138. The verification circuit 134 is configured to facilitate the authentication process of the identity of an individual user of an ATM 106 as well as an association of the individual to an individual computing device 102. The binding circuit 136 is configured to facilitate the binding of an application of an individual computing device 102 associated with an individual with an account of the individual with the financial institution associated with the financial institution computing system 108 using data obtained from an accounts database 138. Data passing through the network interface circuit 132 is encrypted such that the network interface circuit 132 is a secure communication module. In some arrangements, the network interface circuit 132, verification circuit 134, binding circuit 136, and the account database 142 reside in part on different servers in relation to other components or to the whole of a particular component. In some arrangements, some or all the components of the verification circuit 134, binding circuit 136, and accounts database 138 resides in the ATMs 106.

In some arrangements, the verification circuit 134 can be configured to verify the identity of individuals using data receive from the ATMs 106. In some arrangements, the verification circuit is configured to obtain verification through data sent by the ATM 106 comprising the use of a card containing encoded information (e.g., debit card with magnetic stripe) and an inputted personal identification number (PIN) that is passed on to the financial institution computing system 108. Other verification data obtained from the ATM device sensors 124 is passed on to the verification circuit 134. For example, the received verification information comprises biometric information, such as a finger print, thumb print, hand print, or any print of the body. Verification information may also comprise a facial image, an eye image (iris or retina), a vocal sample, captured gait information, hand geometry information, thermogram data, skin reflection data, infrared sensor data, etc. Additional received verification information is obtained from an individual computing device 102 of the individual using the ATM 106. In some arrangements, the additional information comprises a device identifier and a SIM card identifier of an individual computing device 102. In such arrangements, the verification circuit 134 along with the network interface circuit 132 is configured to communicate with an appropriate TelCo computing system 110 to receive additional verification information. Such additional verification information received from the TelCo computing system 110 comprises account holder information (e.g., a name on the account) of the account associated with a device ID and/or SIM card ID number. In some arrangements, data is sent from the verification circuit 134 to the TelCo computing systems 110 for verification (e.g., an account holder name along with a device ID and/or SIM card ID number) and the response is simply a positive or negative verification of the sent data. In some arrangements, the TelCo computing system 110 returns information on an account, such as a name, a phone number, a name of a primary account holder of a family or group cellular plan. In such arrangements, the verification circuit 134 is still able to extract sufficient data to match the individual associated with an ATM 106 session with the individual computing device 102 linked to the received device ID and/or SIM card ID number. In some arrangements where the returned information is an account linked to a family plan, group plan, corporate plan, or the like, the financial institution computing system 108 sends a request for additional verification information to the ATM 106 to prompt the individual for additional verification information. For example, the ATM 106 prompts the individual that the name on the account associated with data stored on the TelCo computing system 110 does not match the name of the individual. The individual is able to select a joint financial account on the financial institution computing system linked to both the individual's name and the name on the account stored on the TelCo computing system 110 and therefore is able to complete the verification. In a variation of the example, the individual is able to supply the name that is on the account and complete the verification in that manner. In another example, the ATM 106 prompts the individual that the name on the account associated with data stored on the TelCo computing system 110 does not match the name of the individual, but instead is linked to a company or corporation. The individual is able to supply the name of the corporation stored on the TelCo computing system 110 and therefore is able to complete the verification. In other arrangements, other data supplied by the individual that can be matched to the data supplied by the TelCo computing system 110 is used. In some arrangements, additional verification information is requested from and received from the TelCo computing system 110 to be matched with information received from the ATM 106 (e.g., biometric data linked to the individual on the TelCo computing system 110).

In some arrangements, the binding circuit 136 can be configured to bind the individual computing device 102 interacting with the ATM 106 to an application for download or installation on the individual computing device 102. In some arrangements, the application is a financial application linked to an account stored in the accounts database 138 of the financial institution computing system 108. In some arrangements, the individual computing device 102 is not bound to the application until verification from the verification circuit 134 is complete. In some arrangements, the binding circuit 136 is configured to bind more than one account in the name of an individual interacting with an ATM 106 with an individual computing device 102. In some arrangements, the binding circuit 136 is configured to send an authorization to the ATM 106 to transmit the application bound to the individual computing device 102 to the individual computing device 102. In other arrangements, the binding circuit 136 is configured to send an authorization to the ATM 106 to transmit an authorization to the individual computing device 102 that allows the individual computing device 102 to download and install the application at a later time. In some arrangements, the authorization has a set expiration date after which it is no longer usable to download and/or install the application. In some arrangements, binding of the individual computing device 102 associates the unique identifier of the individual computing device 102 with one or more accounts on the financial institution computing system 108

In some arrangements, the accounts database 138 is configured to allow the financial institution computing system 108 to retrievably store customer information relating to the various operations discussed herein, and may include non-transient data storage mediums (e.g., local disc or flash-based hard drives, local network servers, and the like) or remote data storage facilities (e.g., cloud servers). The accounts database 138 includes personal customer information (e.g., names, addresses, phone numbers, etc.), identification information (e.g., PINs, social security numbers, driver's license numbers, biometric data, associated device IDs, associated SIM card IDs etc.), and customer financial information (e.g., account numbers, account balances, available credit, credit history, transaction histories, etc.).

The TelCo computing system are associated with various telecommunication providers (e.g., a mobile phone company). The TelCo computing systems 110 include network interface circuits 142, account query circuits 144, and account databases 146. The account query circuits 144 control at least some operations of the TelCo computing systems 110 using data stored in databases or other computer storage structures, such as the accounts databases 146. In some arrangements, the account query circuits 144 are configured to facilitate requests from the financial institution computing system 108 to return account information associated with device IDs and/or SIM card IDs or to transmit responses to the requests in the form of a positive or negative verification of data received in the request. Data passing through the network interface circuits 144 is encrypted such that the network interface circuits 144 are secure communication modules. In some arrangements, the network interface circuit 142, account query circuits 144, and the account databases 146 reside in part on different servers in relation to other components or to the whole of a particular component.

In some arrangements, the account query circuits 144 can be configured to retrieve information from the accounts databases 146 related to account holders of the associated telecommunication company and return the information responsive to requests from the financial institution computing system 108. The received requests include identifying information such as device identifiers of individual computing devices 102 and/or SIM card identifiers. In some arrangements, the account query circuits 144 are configured to match the device identifier and/or SIM card identifier to an account in the accounts databases 146, retrieve the name of the owner of the account and transmit the name of the owner of the account to the financial institution computing system. In some arrangements, the account query circuits 144 are configured to receive a request comprising an identifier (e.g., a name), along with a device identifier and/or SIM card identifier, retrieve account information from the accounts databases 146 matching some portion of the received data, determine if the identifier (e.g., a name) is linked in the database to the device identifier and/or SIM card identifier, and return a positive or negative response to the received request.

In some arrangements, the accounts databases 146 are configured to allow the TelCo computing systems 110 to retrievably store customer information relating to the various operations discussed herein, and may include non-transient data storage mediums (e.g., local disc or flash-based hard drives, local network servers, and the like) or remote data storage facilities (e.g., cloud servers). The accounts databases 146 include personal customer information (e.g., names, addresses, phone numbers, etc.), identification information (e.g., associated device IDs, associated SIM card IDs, biometric data obtained through the use of individual computing devices 102, etc.), and customer financial information (e.g., account numbers, account balances, available credit, credit history, transaction histories, etc.).

Figure 2:
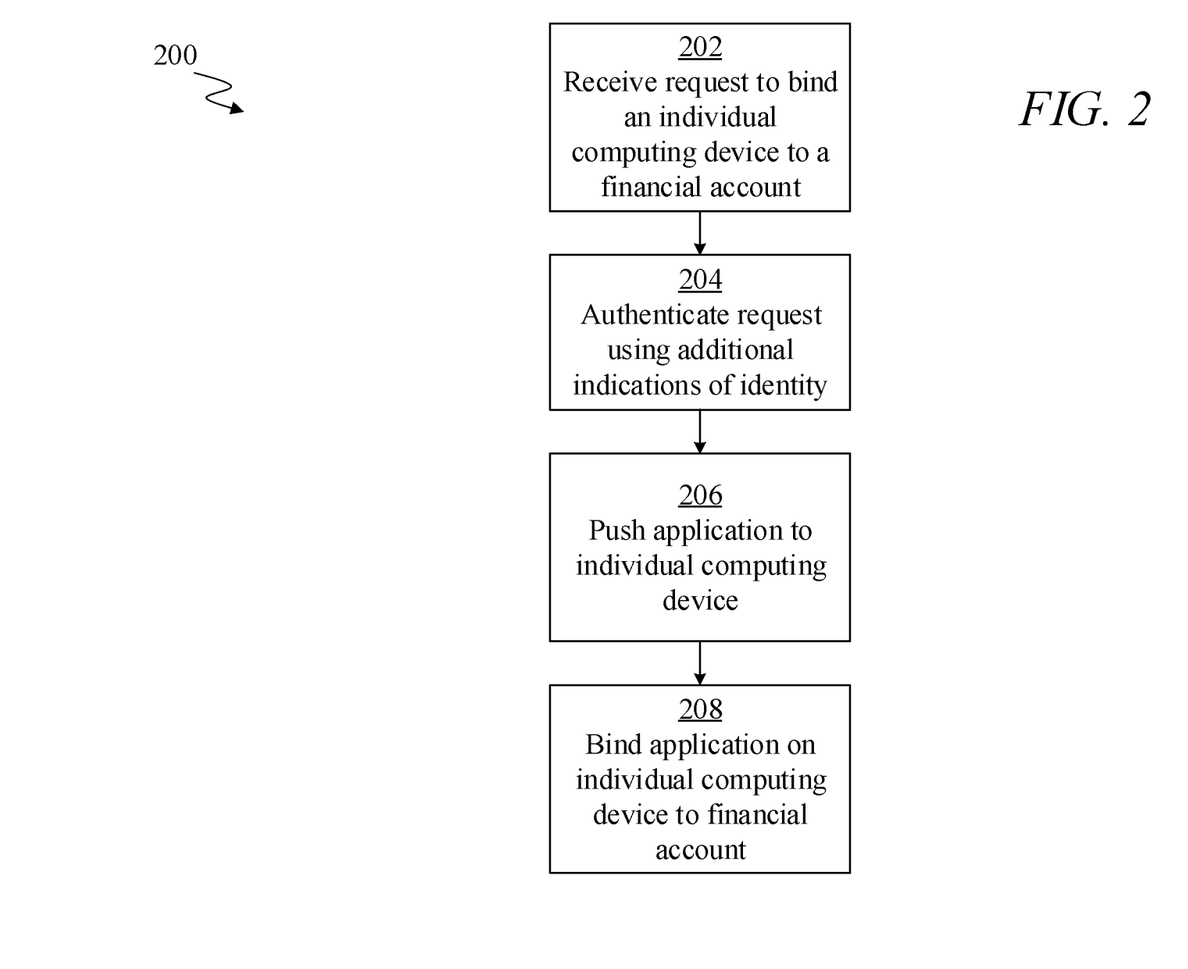
FIG. 2 is a flow diagram of a method of binding an individual computing device to a financial account shown according to an example embodiment.

Referring now to FIG. 2, a flow diagram of a method 200 of binding an individual computing device 102 to a financial account is shown according to an example embodiment. In some arrangements, the method 200 is performed by a financial institution computing system associated with a financial institution (e.g., a financial institution computing system 108). While performing the method 200, the financial institution computing system 108, for example, communicates data over a network interface circuit 132 over the network 104 to individual computing devices 102 and TelCo computing systems 110.

The method 200 begins when a request to bind an individual computing device 102 to a financial account is received at 202. The request is received by the financial institution computing system 108. In some arrangements, binding an individual computing device 102 to a financial account supplies an authorization to allow the individual computing device 102 to download and/or install an application that is capable of accessing the financial account in some manner. In other arrangements, binding an individual computing device 102 to a financial account allows an already installed application on the individual computing device 102 access to information of a financial account. Binding of the individual computing device 102 and/or an application on an individual computing device 102 to a financial account or accounts may also be referred to as provisioning of the individual computing device 102. In some arrangements, the request is received from the individual computing device 102 that is to be bound. In other arrangements, the request is received from a computing device other than the individual computing device 102 that is to be bound. In some arrangements, a computing device sending the request has to initially provide data showing ownership or access to a financial account with a financial institution (e.g., login and password or card data and PIN) to be able to send the request. In some arrangements, the request comprises data tied to the individual computing device 102 such as a device identifier and/or a SIM card identifier. Other identifying data is included in the request including an individual name or further data about the individual computing device 102 such as device model, operating system installed, version information, one or more applications installed, amount of memory, amount of available storage memory, etc.

The request is authenticated using additional indications of identity at 204. In some arrangements, the request is received by the financial institution computing system 108 and additional indications of identity are obtained from communicating with other computing systems (e.g., TelCo computing systems 110). Such additional indications of identity information received from, for example, TelCo computing systems 110, comprise account holder information (e.g., a name on the account) of the account associated with a device ID and/or SIM card ID number that has been sent to the TelCo computing system 110. In some arrangements, data is sent to the TelCo computing systems 110 for verification (e.g., an account holder name along with a device ID and/or SIM card ID number) and the response is simply a positive or negative verification of the sent data. In some arrangements, the TelCo computing system 110 returns information on an individual account (e.g., account holder name) or on an account linked to a family or group plan (e.g., primary account holder/biller name). In such arrangements, the sufficient data may still be extracted from the data received from the TelCo computing system 110 to match an individual associated with an individual computing device 102 and its associated device ID and/or SIM card ID number. In some arrangements, where the returned information is an account linked to a family or group plan, a prompt is sent to the requestor to supply additional verification information. For example, the individual is prompted to supply another name that matches the name on the account stored on the TelCo computing system 110 in order to complete the authentication through the use of additional indications of identity. In some arrangements, additional verification information is requested from and received from the TelCo computing system 110 to be matched with information already stored on a financial institution computing system 108 (e.g., biometric data linked to the individual on the TelCo computing system 110).

The application is pushed to an individual computing device at 206. In some arrangements, the application is pushed to the individual computing device 102 by the financial institution computing system 108. The individual computing device 206 is the device in the request to be bound to a financial account or accounts and the request has been authenticated. In some arrangements, the application is transmitted to the individual computing device 102 for installation. In other arrangements, only an authorization to install and/or active an application that is or will be on the individual computing device 102 is transmitted.

The application on the individual computing device 102 is bound to a financial account at 208. In some arrangements, the financial institution computing system 108 binds the application to the financial account(s). The financial account is an account that is associated with an individual associated with the individual computing device 102. In some arrangements, the account is with a financial institution associated with a financial institution computing system 108. In some arrangements, the individual computing device 102 is bound to the financial account or accounts and future requests for the same application or other applications from the financial institution are authorized to be installed and used. For example, the unique identifier of the individual computing device 102 is associated with the financial account such that when the individual computing device 102 attempts to access the financial account (e.g., via a mobile banking website, via a mobile banking application, via NFC tap at an ATM, installation of a mobile banking application, etc.), the unique identifier is used as an authentication element and/or the unique identifier indicates to the financial institution computing system 108 that the individual computing device 102 is authorized to access the accounts. In other arrangements, the application is bound to the financial account(s), and future installations of the same application or other applications associated with the financial account must be re-authenticated and/or re-approved. In some arrangements, binding allows access to the financial account and information from the accounts database 138 of the financial institution computing system 108 whether the binding is of the device or limited to an application. Access includes viewing financial data, creating transactions, receiving alerts, changing settings, creating new accounts or sub-accounts, etc.

Figure 3:
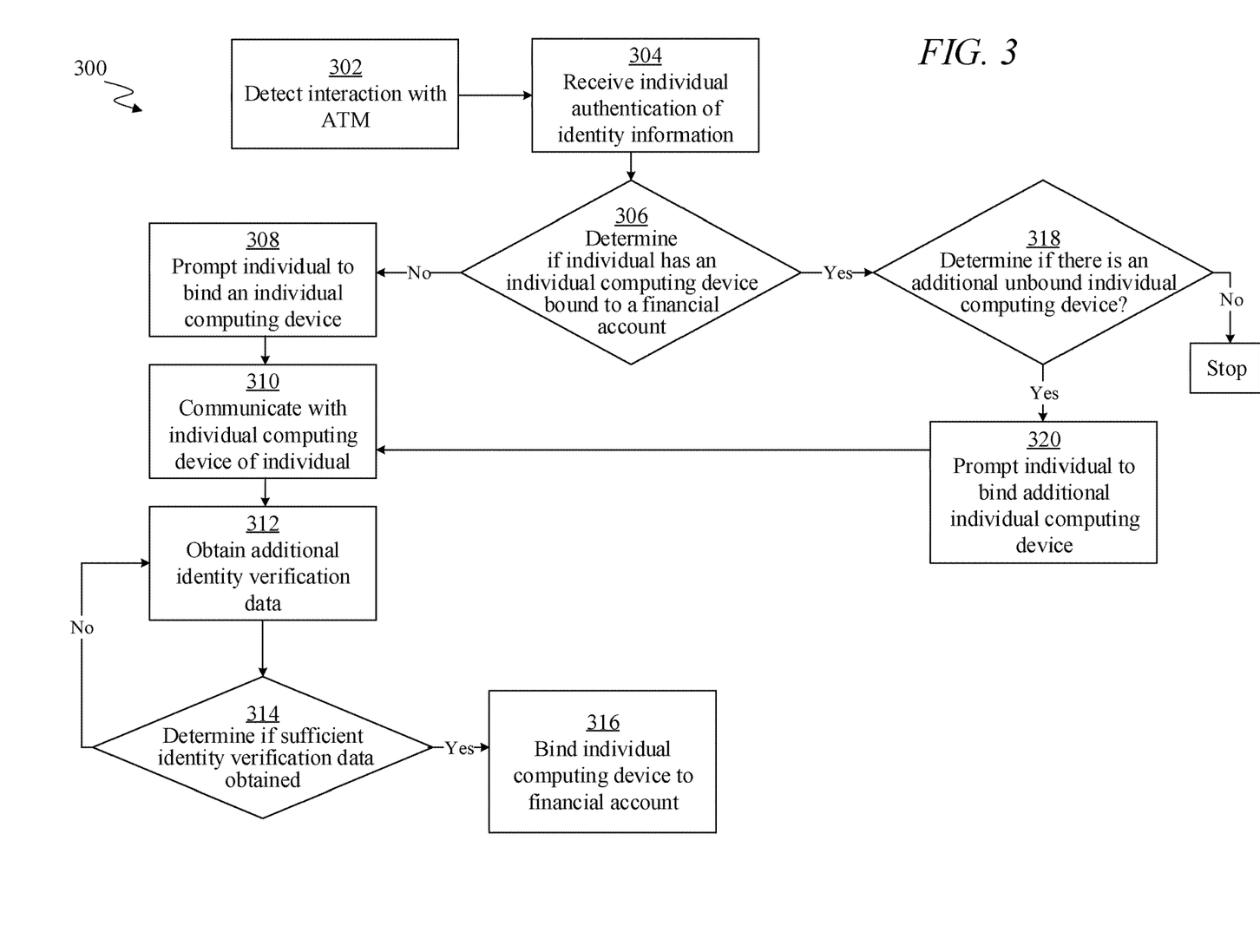
FIG. 3 is a flow diagram of a method of using an ATM to facilitate binding an individual computing device to a financial account shown according to an example embodiment.

Referring now to FIG. 3, a flow diagram of a method 300 of using an ATM 106 to facilitate binding an individual computing device 102 to a financial account is shown according to an example embodiment. In some arrangements, the method 300 is performed by an ATM 106. While performing the method 300, the ATM communicates data over a network interface circuit 122 over the network 104 to a financial institution computing system 108 and to TelCo computing systems 110. In some other arrangements, one or more steps of method 300 can be performed by the financial institution computing system 108 in communication with the ATMs 106 and the TelCo computing systems 110.

The method 300 begins when an interaction is detected with an ATM 106 at 302. In some arrangements, the interaction is an interaction by an individual user of the ATM 106, detected by the ATM 106, the individual user using an input method on the ATM 106 such as a touchscreen, card reader, NFC communication reader, etc. In some arrangements, the interaction begins due to proximity of the individual to the ATM 106 through various ATM device sensors 124 (e.g., cameras—facial recognition/gait recognition/hand geometry recognition, scanners—iris/retina/thermogram/skin reflection/infrared, voice or sound recognition microphones, etc.).

Authentication of identity information of the individual is received at 304. In some arrangements, the authentication information is received by the ATM 106. In some arrangements, the authentication information is card data read from an ATM card and an entered PIN. In some arrangements, authentication information comprises data obtained from ATM device sensors 124 (e.g., biometric information, such as a finger print, thumb print, hand print, or any print of the body, a facial image, an eye image (iris or retina), a vocal sample, captured gait information, hand geometry information, thermogram data, skin reflection data, infrared sensor data, etc.). In some arrangements, authentication information is received by an electronic user device (e.g., an individual computing device 102) held or in proximity to the individual and includes information entered into the electronic device by the individual (e.g., information entered by the user into the electronic device such as a password, an image generated by the device, a quick response (QR) code or other machine-readable code generated by the device, biometric data gathered by the device or other information provided by security features of the device, etc.).

A determination is made if the individual has an individual computing device 102 bound to a financial account at 306. In some arrangements, the determination is made by an ATM 106 and the ATM 106 communicates with an associated financial institution computing system 108 to make the determination. In other arrangements, the ATM 106 has access to a database linked to a financial account of the individual containing the information. In some arrangements, an individual computing device 102 is bound if the individual computing device 102 itself is bound to a financial account or accounts of the individual. In other arrangements, an individual computing device 102 is considered bound if one or more applications installed on the individual computing device 102 are bound to a financial account or accounts or otherwise authorized to access a financial account. In some arrangements, the determination of whether the individual has an individual computing device 102 bound to a financial account or accounts is done if an individual computing device 102 is detected in proximity to an ATM 106 when there is interaction with the ATM 106. Proximity to an individual computing device 102 is detected by various sensors and communication protocols (e.g., Bluetooth® transceivers, Bluetooth® beacons, RFID transceivers, NFC transceivers, Wi-Fi transceivers, cellular transceivers, etc.).

If there is a determination that no individual computing device 102 is bound to a financial account of the individual, the individual is prompted to bind an individual computing device 102 at 308. In some arrangements, the individual is prompted through a touchscreen display or other display of an ATM 106. In some arrangements, the individual is only prompted upon detection by the ATM 106 of an individual computing device 102 in proximity. In some arrangements, the individual computing device 102 must first be paired with the ATM 106. Various options are presented on a display by the ATM 106 to pair the individual computing device (e.g., NFC tap to pair, Bluetooth® to pair, scan code to pair, etc.)

The individual computing device 102 of the individual is communicated with at 310. In some arrangements, the individual computing device 102 is communicated with by an ATM 106. In some arrangements, the ATM 106 must have been paired to the individual computing device 102 prior to communicating. In some arrangements, the communication allows for unique device information (e.g., device ID, SIM card ID, etc.) of the individual computing device 102 to be transmitted to the ATM 106. In some arrangements, other data is transferred, including sensor information, installed application information, application installation files, etc.

Additional identity verification data is obtained at 312. In some arrangements, the additional identity verification data is obtained by the ATM 106. In some arrangements, additional identity verification data is obtained from communicating by the ATM 106 with other computing systems (e.g., a financial institution computing system 108 or TelCo computing systems 110). Such additional indications of identity information received from, for example, TelCo computing systems 110, or indirectly from a TelCo computing system 110 from a financial institution computing system 108 comprises account holder information (e.g., a name on the account) of the account associated with a device ID and/or SIM card ID number that has been sent to the TelCo computing system 110. In some arrangements, data is sent to the TelCo computing systems 110 for verification (e.g., an account holder name along with a device ID and/or SIM card ID number) directly or indirectly and the response is simply a positive or negative verification of the sent data. In some arrangements, the TelCo computing system 110 returns information on an account linked to a family or group plan. In such arrangements, the sufficient data may still be extracted from the data received from the TelCo computing system 110 to match an individual associated with an individual computing device 102 and its associated device ID and/or SIM card ID number. For example, the ATM 106 prompts the individual that the name on the account associated with data stored on the TelCo computing system 110 does not match the name of the individual. The individual is able to select a joint financial account on the financial institution computing system linked to both the individual's name and the name on the account stored on the TelCo computing system 110 and therefore is able to complete the verification. In a variation of the example, the individual is able to supply the name that is on the account and complete the verification in that manner. In another example, the ATM 106 prompts the individual that the name on the account associated with data stored on the TelCo computing system 110 does not match the name of the individual, but instead is linked to a company or corporation. The individual is able to supply the name of the corporation stored on the TelCo computing system 110 and therefore is able to complete the verification. In other arrangements, other data supplied by the individual that can be matched to the data supplied by the TelCo computing system 110 is used.

A determination if sufficient identity verification data has been obtained is made at 314. In some arrangements, the determination is made by the ATM 106. In some arrangements, additional identity verification data is obtained from communicating with other computing systems (e.g., a financial institution computing system 108 or TelCo computing systems 110). In some arrangements, sufficient identity verification data has been obtained if the individual has accessed their financial account through the ATM 106 and their name has been matched through information received from the TelCo computing system 110 servicing the individual computing device 102 associated with the device ID and/or SIM card ID number of the individual computing device 102. In some arrangements where the returned information from the TelCo computing system is associated with an account linked to a family or group plan, a prompt is sent to the individual to supply additional verification information and additional identity verification data is obtained at 312. For example, the individual is prompted to supply another name that matches the name on the account stored on the TelCo computing system 110 in order to complete the authentication through the use of additional indications of identity. In some arrangements, additional verification information is requested from and received from the TelCo computing system 110 to be matched with information already stored on a financial institution computing system 108 (e.g., biometric data linked to the individual on the TelCo computing system 110) for additional verification. In some arrangements, this additional verification information is only obtained if a name match is unable to be completed successfully.

The individual computing device 102 is bound to a financial account at 316. In some arrangements, the individual computing device 102 is bound by the ATM 106 and the financial account is an account or accounts that is associated with the individual. In some arrangements, the account(s) is with a financial institution associated with the financial institution computing system 108. In some arrangements, the ATM 106 pushes an application to an individual computing device 102 for installation. This is done via NFC transceivers, Wi-Fi transceivers, cellular transceivers, and the like. In other arrangements, only an authorization to install and/or active an application that is or will be on the individual computing device 102 is transmitted. In some arrangements, the individual computing device 102 is bound to the financial account(s) and future requests for the same application or other applications from the financial institution are authorized to be installed and used. In other arrangements, an application is bound to the financial account(s), and future installations of the same application or other applications associated with the financial account must be re-authenticated and/or re-approved. In some arrangements, binding allows access to the financial account and information from the accounts database 138 of the financial institution computing system 108. Access includes viewing financial data, creating transactions, receiving alerts, changing settings, creating new accounts or sub-accounts, etc.

If there is a determination that there is an individual computing device 102 bound to a financial account of the individual at 306, a determination is made if there is an additional unbound individual computing device 102 at 318. In some arrangements, this is determined by the ATM 106 prompting the individual and obtaining a response (e.g., through a touchscreen display or other display of the ATM 106). In some arrangements, the individual is only prompted upon detection by the ATM 106 of an individual computing device 102 in proximity. Sufficient information is exchanged with the individual computing device 102 to determine that is a different individual computing device 106 than the individual computing device 102 already bound to a financial account or accounts of the individual. In some arrangements, any additional individual computing device 102 must first be paired with the ATM 106 if desired by the individual to also bind the additional computing device 102 to a financial account. Proximity to an individual computing device 102 may be detected by various sensors and communication protocols (e.g., Bluetooth® transceivers, Bluetooth® beacons, RFID transceivers, NFC transceivers, Wi-Fi transceivers, cellular transceivers, etc.).

If there is a determination that there is an additional individual computing device 102 to be bound to a financial account of the individual, the individual is prompted to bind the additional individual computing device 102 at 320. In some arrangements, the individual is prompted through a touchscreen display or other display of an ATM 106. In some arrangements, the individual is only prompted upon detection by the ATM 106 of the individual computing device 102 in proximity. In some arrangements, the additional individual computing device 102 must first be paired with the ATM 106. Various options are presented by the ATM 106 to pair the individual computing device (e.g., NFC tap to pair, Bluetooth® to pair, scan code to pair, etc.)

Figure 4:
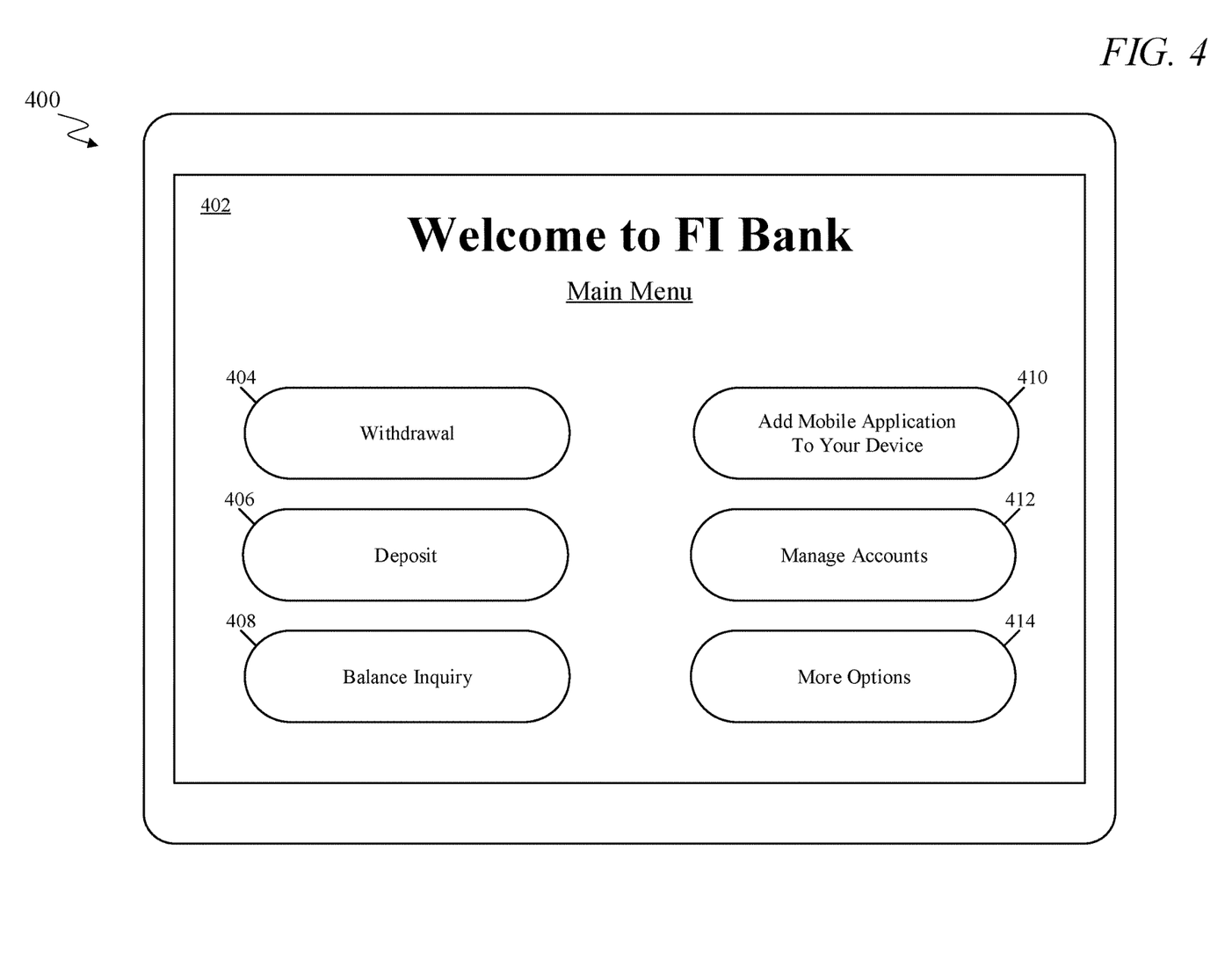
FIG. 4 is an interface on a display of an ATM including graphics displaying a start screen and selection options shown according to an example embodiment.

Referring now to FIG. 4, an interface 400 on a display of an ATM including graphics display a start screen 402 and selection options is shown according to an example embodiment. The interface 400 on a display of an ATM 106 includes a menu of transaction options. The menu of transaction options includes a plurality of user-selectable button icons corresponding to various operations that can be performed on the ATM 106. In the arrangement shown, the menu includes a withdrawal button 404, a deposit button 406, a balance inquiry button 408, an add mobile application to your device button 410, a manage accounts button 412, and a more options button 414. Selecting the withdrawal button 404 allows an individual to specify a financial account (e.g., a financial account linked to an account identifier provided to the ATM 106) and a sum of paper currency to be withdrawn from the financial account, which is provided through a currency dispenser. Selecting the deposit button 406 allows the individual to provide one or more paper checks or paper currency to the ATM 106 (e.g., via a deposit slot) for deposit to one or more accounts maintained at the financial institution computing system 108. Selecting the balance inquiry button 408 allows the individual to receive information relating to account balances at the financial institution computing system 108. Selecting the add mobile application to your device button 410 allows the individual to start pairing an individual computing device 102 to the ATM in order to receive authorization to install an application and to either bind the application or the individual computing device to a financial account of the individual. In some arrangements, the application is pushed to the individual computing device 102 from the ATM. In some arrangements, the add mobile application to your device button 410 is not active if an individual computing device 102 has not been detected to be in proximity and/or it is determined that the individual computing device 102 has already been bound to a financial account or accounts of the individual. The manage accounts button 412 enables the individual to manage accounts currently linked to the account identifier provided to the ATM 106. The more options button 414 allows the individual to access additional functions of the ATM 106 that are not shown on the welcome screen 301.

Figure 5:
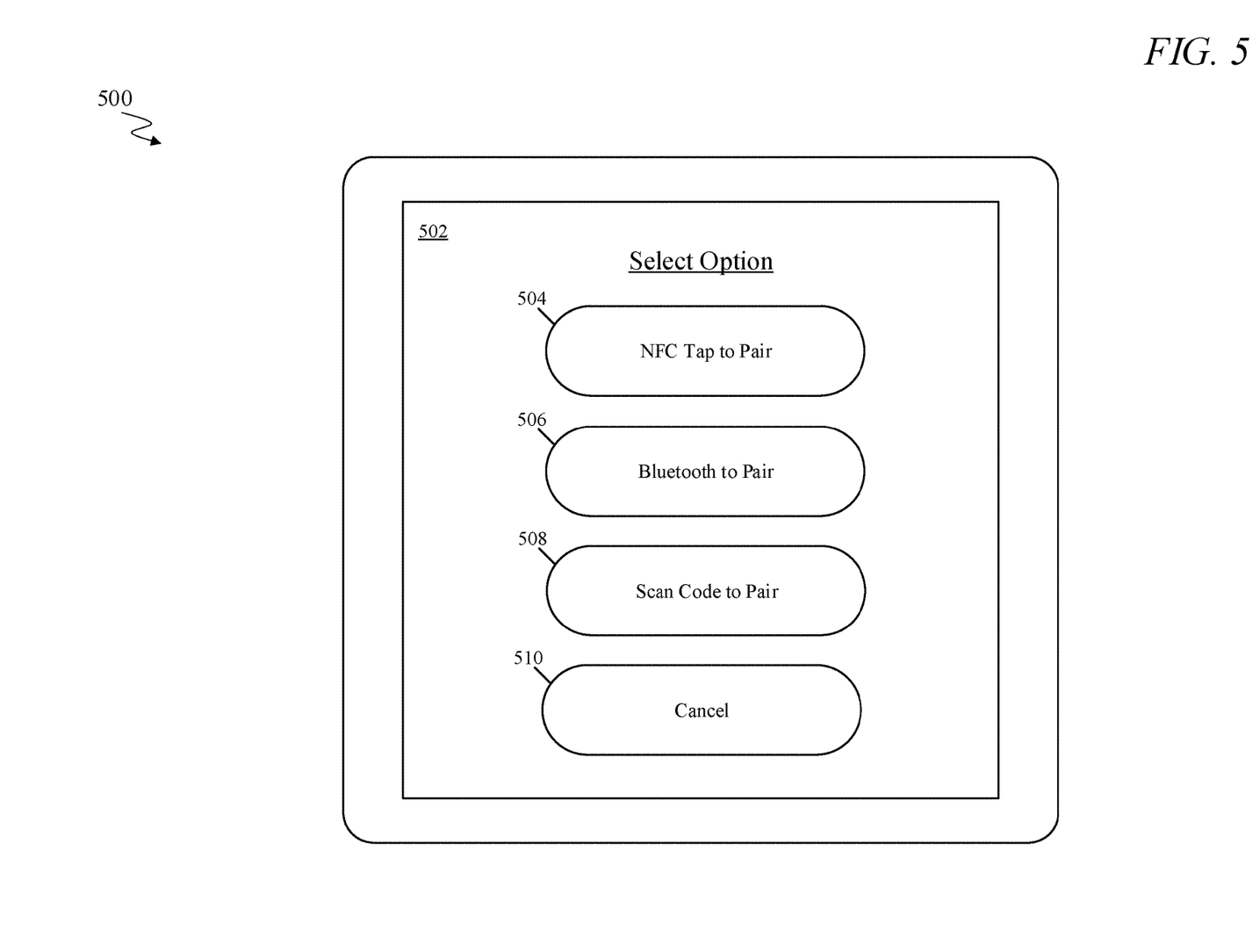
FIG. 5 is an interface on a display of an ATM including graphics displaying device connection options shown according to an example embodiment.

Referring now to FIG. 5, responsive to selection of the add mobile application to your device button 410 of the start screen 402, an interface 500 on a display of an ATM including graphics displaying device connection options is shown according to an example embodiment. The device connection options are shown as part of a select options screen 502. The select options screen 502 includes an NFC tap to pair button 504, a Bluetooth tap to pair button 506, a scan code to pair button 508, and a cancel button 510. The cancel button 510 causes the graphical user interface to return to the start screen 402. The NFC tap to pair button 504 causes the ATM 106 to establish a communication connection through a NFC transceiver to an individual computing device 102 for data communication including one or both of a device identifier and SIM card identifier of the individual computing device 102. The Bluetooth tap to pair button 506 causes the ATM 106 to establish a communication through a Bluetooth connection to an individual computing device 102 for data communication including one or both of a device identifier and SIM card identifier of the individual computing device 102. In some arrangements, low-power Bluetooth to ensure a close proximity connection is used. The scan code to pair button 508 causes the ATM 106 to display a scannable barcode (e.g., a QR code) that can be scanned by a camera integrated in the individual computing device 102. In some arrangements, the scannable barcode launches a website to be used as a secure data portal for communication with the ATM 106. In some arrangement, the secure data portal communications directly to the financial institution computing system 108 associated with the ATM. In some arrangements, the individual computing device 102 needs to be scanning for a new connection for one or more of these data connection possibilities. Other communication protocols and methods, particularly those requiring close proximity of the communicating devices, are possible.

Figure 6:
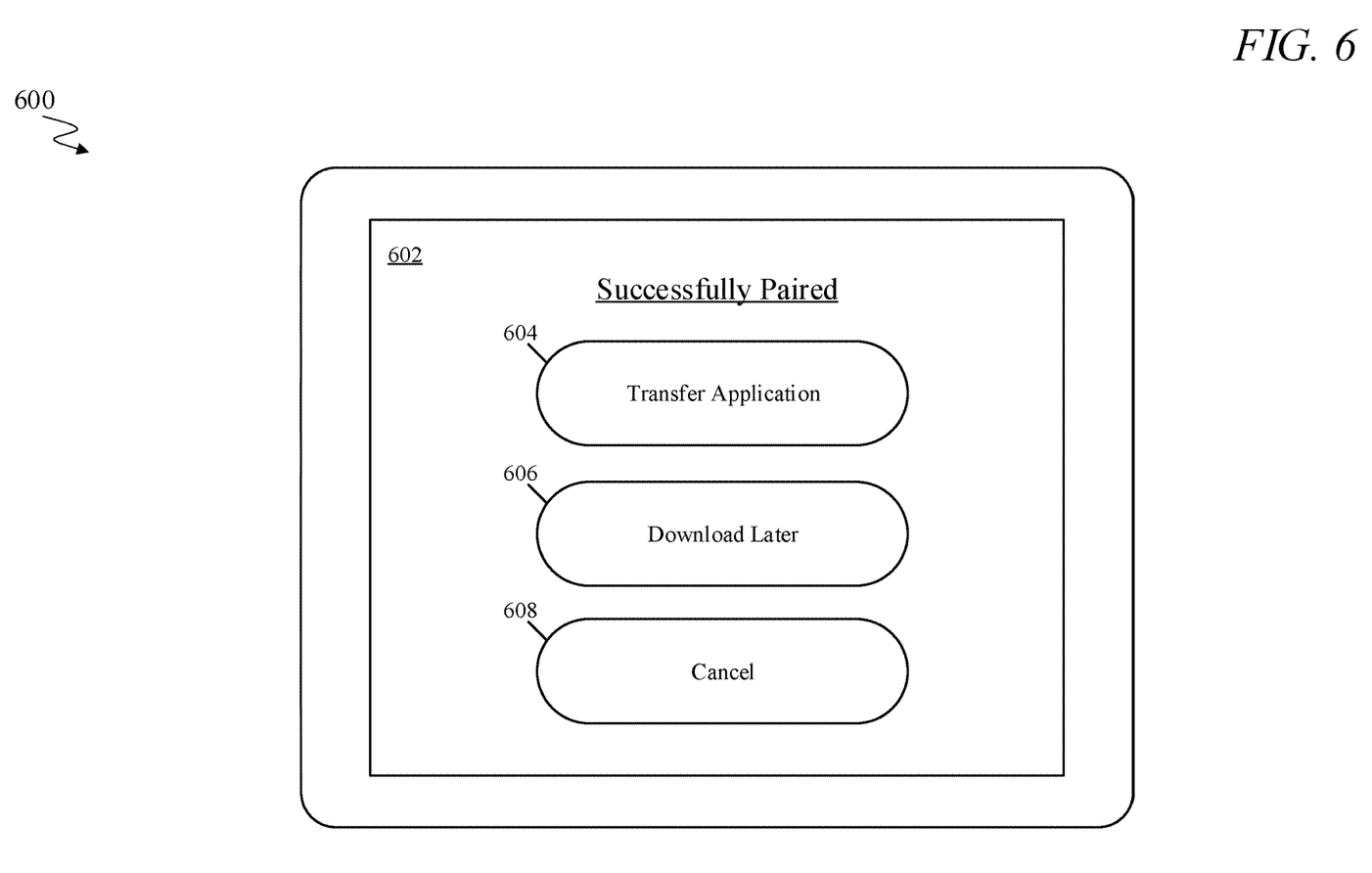
FIG. 6 is an interface on a display of an ATM including graphics displaying application transfer options shown according to an example embodiment.

Referring now to FIG. 6, responsive to a successful pairing of the ATM 106 to an individual computing device 102, an interface 600 on a display of an ATM including graphics displaying application transfer options is shown according to an example embodiment. The application transfer options are shown as part of a successfully paired screen 602. The successfully paired screen 602 includes a transfer application button 604, a download later button 606, and a cancel button 608. The cancel button 608 causes the graphical user interface to return to the start screen 402. In some arrangements, the transfer application button 604 causes the ATM 106 to push application installation files to the paired individual computing device 102, wherein the application once installed is bound to a financial account or accounts linked to the individual. In some arrangements, the individual computing device 102 itself is bound to a financial account or accounts linked to the individual. In some arrangements, the download later button 606 pushes data to the individual computing device 102 authorizing a later download of the application to be bound to a financial account or accounts linked to the individual. In some arrangements, the application is already installed on the individual computing device 102 and the authorization data is used to bind the application and/or individual computing device to a financial account or accounts linked to the individual.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc.

Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   determining, by an Automated Teller Machine (ATM), that an individual computing device of a user and in proximity of the ATM is not associated with a financial account associated with the user;
   displaying, by the ATM on a display of the ATM, a prompt comprising instructions to bind the individual computing device of the user to the financial account associated with the user;
   receiving, by the ATM from the individual computing device, a unique identifier of the individual computing device;
   sending, by the ATM, the unique identifier to a telecommunication company computing system;
   receiving, by the ATM, data from the telecommunication company computing system consequent to sending the unique identifier;
   matching, by the ATM, the data received from the telecommunication company computing system to the financial account;
   binding, by the ATM, the individual computing device to the financial account based at least in part on the received unique identifier of the individual computing device, the data received from the telecommunication company computing system, and the matching of the data; and
   transmitting, by the ATM to the individual computing device, an application authorization, the application authorization authorizing an application to complete operations associated with the financial account via the bound individual computing device.

2. The method of claim 1, comprising transmitting, by the ATM to the individual computing device, the application, the application being bound to the financial account.

3. The method of claim 1, wherein the unique identifier is at least one of a device identifier or a subscriber identity module (SIM) card identifier.

4. The method of claim 1, wherein the unique identifier is received by the ATM via a near-field communication (NFC) protocol.

5. The method of claim 1, wherein the unique identifier is received by the ATM via a low power Bluetooth protocol.

6. The method of claim 1, comprising authenticating, by the ATM, an identity of the user based at least in part on a biometric attribute.

7. An automated teller machine (ATM) comprising:
   a display;
   a network interface; and
   an authentication circuit configured to:
      determine that an individual computing device of a user and in proximity of the ATM is not associated with a financial account associated with the user;
      display, on the display, a prompt comprising instructions to bind the individual computing device of the user to the financial account associated with the user;
      receive, from the individual computing device, a unique identifier of the individual computing device;
      send the unique identifier to a telecommunication company computing system;
      receive data from the telecommunication company computing system consequent to sending the unique identifier;
      match the data received from the telecommunication company computing system to the financial account;
      bind the individual computing device to the financial account based at least in part on the received unique identifier of the individual computing device, the data received from the telecommunication company computing system, and the matching of the data; and
      transmit, to the individual computing device, an application authorization, the application authorization authorizing an application to complete operations associated with the financial account via the bound individual computing device.

8. The ATM of claim 7, the authentication circuit configured to transmit, to the individual computing device, the application, the application being bound to the financial account.

9. The ATM of claim 7, wherein the unique identifier is at least one of a device identifier or a subscriber identity module (SIM) card identifier.

10. The ATM of claim 7, wherein the unique identifier is received by the ATM via a near-field communication (NFC) protocol.

11. The ATM of claim 7, wherein the unique identifier is received by the ATM via a low power Bluetooth protocol.

12. The ATM of claim 7, the authentication circuit configured to authenticate an identity of the user based at least in part on a biometric attribute.

13. A non-transitory computer readable medium having computer-executable instructions embodied therein that, when executed by at least one processor of a computing system, cause the computing system to perform first operations, the first operations comprising:
   determining that an individual computing device of a user and in proximity of an Automated Teller Machine (ATM) is not associated with a financial account associated with the user;

displaying, on a display of the ATM, a prompt comprising instructions to bind the individual computing device of the user to the financial account associated with the user;

receiving, from the individual computing device, a unique identifier of the individual computing device;

sending the unique identifier to a telecommunication company computing system;

receiving data from the telecommunication company computing system consequent to sending the unique identifier;

matching the data received from the telecommunication company computing system to the financial account;

binding the individual computing device to the financial account based at least in part on the received unique identifier of the individual computing device, the data received from the telecommunication company computing system, and the matching of the data; and transmitting, to the individual computing device, an application authorization, the application authorization authorizing an application to complete second operations associated with the financial account via the bound individual computing device.

14. The non-transitory computer readable medium of claim 13, wherein the unique identifier is at least one of a device identifier or a subscriber identity module (SIM) card identifier.

15. The non-transitory computer readable medium of claim 13, wherein the unique identifier is received by the computing system via a near-field communication (NFC) protocol.

16. The non-transitory computer readable medium of claim 13, wherein the unique identifier is received by the computing system via a low power Bluetooth protocol.

* * * * *